United States Patent
Gschwend et al.

[11] Patent Number: 5,836,405
[45] Date of Patent: Nov. 17, 1998

[54] FASTENING APPARATUS FOR AND METHOD OF SETTING FASTENING ELEMENTS

[75] Inventors: Hans Gschwend, Buchs, Switzerland; Martin Noser, Vaduz, Liechtenstein

[73] Assignee: Hilti Aktiengesellschaft, Schaan, Liechtenstein

[21] Appl. No.: 862,529

[22] Filed: May 23, 1997

[30] Foreign Application Priority Data

May 24, 1996 [DE] Germany .................. 196 20 955.2

[51] Int. Cl.⁶ .................. E21B 7/00; F16B 13/04
[52] U.S. Cl. .................................. 175/57; 411/29
[58] Field of Search .................. 175/57, 295; 411/29, 411/55, 60

[56] References Cited

U.S. PATENT DOCUMENTS

| | | | |
|---|---|---|---|
| 3,396,930 | 8/1968 | Gregorovic . | |
| 4,544,041 | 10/1985 | Rinaldi | 175/57 |
| 4,720,224 | 1/1988 | Peterken | 411/36 |
| 4,750,571 | 6/1988 | Geeting | 175/57 |
| 4,966,511 | 10/1990 | Lee | 411/55 |
| 5,183,357 | 2/1993 | Palm | 411/29 |
| 5,232,322 | 8/1993 | Regensburger . | |
| 5,456,326 | 10/1995 | Raines | 175/57 |

FOREIGN PATENT DOCUMENTS

| | | |
|---|---|---|
| 0464574 | 1/1992 | European Pat. Off. . |
| 3914512 | 11/1990 | Germany . |

OTHER PUBLICATIONS

European Search Report, No. EP 97 810 298.6 dated Aug. 26, 1997.

*Primary Examiner*—Frank Tsay
*Attorney, Agent, or Firm*—Anderson, Kill & Olick, P.C.

[57] ABSTRACT

Fastening apparatus is formed of a drilling tool (3) for drilling an axially extending borehole in a receiving material. The drilling tool (3) has a cutting member (4) at its leading end and its trailing end (5) is arranged to be inserted into a chuck in a hand held drilling device capable of rotating the drilling tool and providing axially directed hammer-like blows. A tubular fastening element (2) has a bore extending between its leading and trailing ends and is arranged to be anchored in the borehole formed by the drilling tool. The diameter of the bore in the fastening element is greater than the outside diameter of a cutting circle formed by the cutting member (4) of the drilling tool (3). The drilling tool (3) extends axially through the bore in the fastening element so that its cutting member projects from one end of the fastening element and its trailing end extends outwardly from the trailing end of the fastening element. The drilling tool is rotated by the drilling device, however, the fastening element is not rotated. While the borehole is being drilled by the drilling tool, the trailing end of the fastening element is contacted by the drilling device, directing hammer-like blow against the trailing end of the fastening element so that simultaneously the fastening element is driven into the borehole being formed by the drilling tool. Due to its configuration, the fastening element is anchored in the borehole. The fastening apparatus carries out a method of directly mounting the fastening element in a borehole, as the borehole is formed by the fastening apparatus.

12 Claims, 3 Drawing Sheets

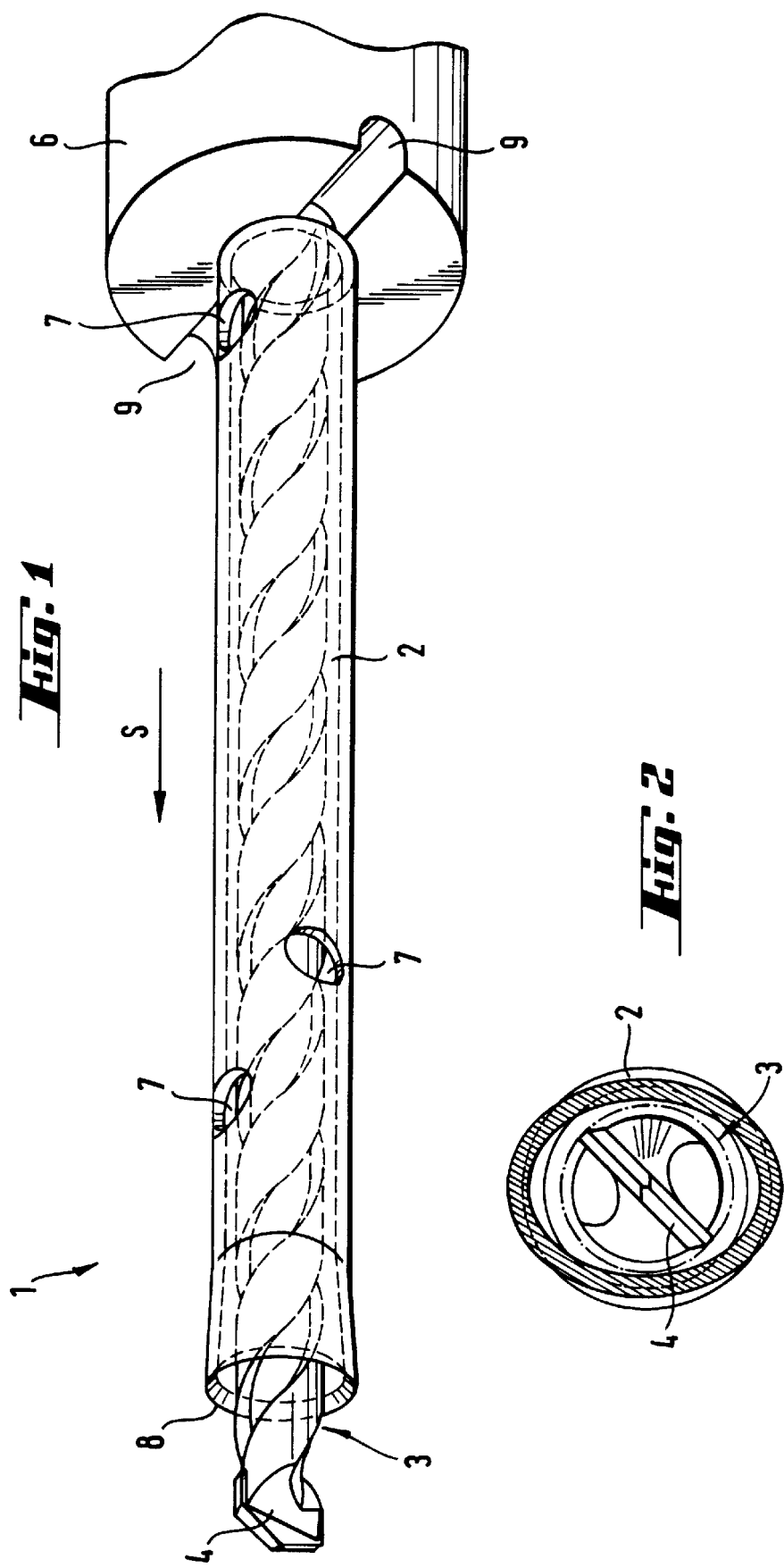

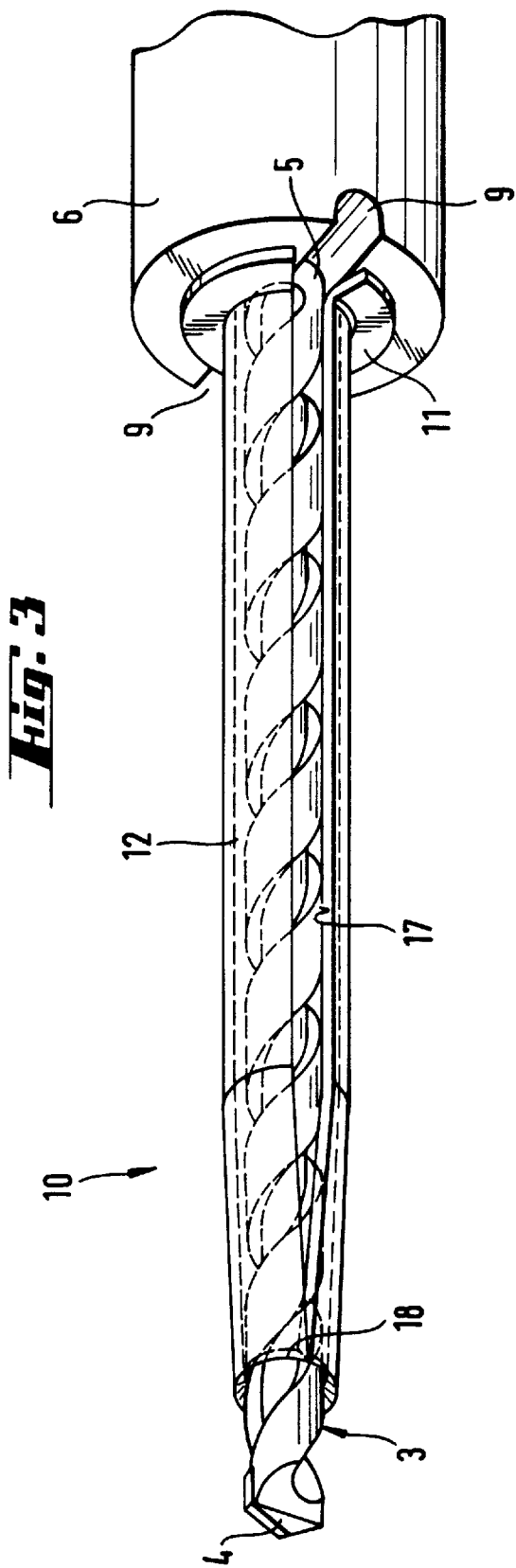

5,836,405

FASTENING APPARATUS FOR AND METHOD OF SETTING FASTENING ELEMENTS

BACKGROUND OF THE INVENTION

The present invention is directed to a fastening apparatus including an axially extending drilling tool for drilling a borehole. The drilling tool has a cutting member at a leading end and its trailing end is shaped for insertion into a chuck of a hand held drilling device. The drilling device is capable of providing a rotary drive and, in addition, axially directed percussive blows. An axially extending tubular fastening element is driven into the borehole formed by the drilling tool. In addition, the invention includes a method of anchoring a fastening element in a borehole formed in a receiving material by drilling an axially extending borehole in the material and anchoring the fastening element in the borehole.

Different methods are used to secure fastening elements or anchors in receiving materials of varying strengths with the most common of such methods being the sequential method and the direct mounting method. The sequential method is suitable for all kinds of receiving materials. Further, different types of fastening elements are used depending on the characteristics of the receiving material and the anchoring values to be achieved. In the sequential method initially a borehole is drilled in the receiving material using a drilling tool. The drilling tool can be a metal drill, lock drill or wood drill powered by a rotary driving or drilling device possibly including auxiliary percussive blow means. After the borehole is drilled, a fastening element is inserted and, in most cases, anchored by expansion.

In the direct mounting method, a special fastening element is driven directly into a receiving material by an explosive powder actuated setting device. In this anchoring method, there is no separate formation of a borehole for the fastening element. The direct mounting method is fast and produces anchors with good holding values. The known direct mounting method, however, is suitable only for certain receiving materials, such as steel or concrete.

Less strong or brittle receiving materials, such as brick masonry, are very highly stressed and often damaged in the known direct mounting method using explosive powder actuated setting devices and do not result in reliable anchorages. Accordingly, only the sequential fastening method is used for anchors in such receiving materials. Such method does not damage the receiving material and provides dependable anchors with the desired holding values Such anchorages, however, are achieved only at the cost of greater expenditures in time per fastener location. In addition, separate devices are usually needed for producing the boreholes and for securing the fastening elements in the boreholes, for example, a drilling device with a drilling tool for drilling the borehole and a screw-driving device for inserting a fastening element into a dowel positioned in the borehole with the subsequent expansion of the dowel.

Therefore, there is a need for a fastening apparatus and a fastening method which affords fast and dependable anchoring of the fastening elements in less strong or brittle receiving materials, such as brick masonry. In the direct mounting method the steps of separately producing the borehole, with the subsequent insertion of a fastening element into the borehole, and finally the expansion of the fastening element shall be avoided. By the fastening apparatus and method according to the invention, it shall be unnecessary to use several different tools for forming the borehole and for the subsequent anchoring of the fastening element. The receiving material must not be damaged and anchoring shall be obtained having the required holding values.

SUMMARY OF THE INVENTION

Therefore, the primary object of the present invention is to provide a fastening apparatus for and a method of anchoring fastening elements in a receiving material in a single operational step. The fastening apparatus comprises a drilling tool for drilling boreholes with the drilling bit having a cutting member at one end and arranged at its opposite end to be secured in the chuck of a hand held device capable of imparting rotation and percussive driving force, and an axially extending tubular fastening element with a bore extending through it with the element arranged to be anchored in the borehole formed by the drilling bit.

In accordance with the present invention, the tubular fastening element has a larger outside diameter than the outside circle diameter formed by the cutting member of the drilling tool. The drilling tool extends through the bore in the tubular fastening element with the leading cutting member extending axially outwardly from the leading end of the fastening element and with the trailing end of the drilling tool projecting axially from the trailing end of the fastening element. The drilling tool is rotated by the drilling device, however, the fastening element does not rotate with the drilling tool. The trailing end of the fastening element contacts the hand held device during the drilling operation so that axially directed hammer-like blows developed by the drilling device are transmitted to the fastening element and the fastening element is driven into the borehole at the same time that the borehole is drilled with the fastening element being anchored in the borehole.

The fastening apparatus incorporating the present invention permits anchors to be secured in less strong or brittle receiving material, such as brick masonry, in a direct mounting method. Although an axially extending borehole is formed as has been done previously, the fastening element is anchored in the borehole at the same time that the drilling operation takes place. Accordingly, the entire procedure of forming an anchorage location is simplified and the total time required for completing the anchorage is considerably reduced. Moreover, the production of an anchorage with the fastening apparatus according to the invention does not require different devices for forming the borehole and for subsequently inserting and anchoring the fastening element. The fastening apparatus afforded by a fastening element and a drilling tool requires only a single hand held device with the drilling tool being separate from the fastening element so that it rotates during the setting operation and at the same time the drilling device drives the fastening element into the borehole formed in the receiving material by axially directed hammer-like blows. The fastening apparatus embodying the invention is simple to use and it combines the advantages of the quick production of anchorages using a direct mounting method with the careful treatment of the receiving material achieved in the sequential fastening method. The invention makes it possible to produce anchors in less strong or brittle receiving materials, for instance, brick masonry, by a direct mounting method.

In a preferred embodiment of the fastening apparatus of the invention, the fastening element is provided with knife edges at its leading end, that is, the end inserted first into the borehole, and the leading end has a cross sectional shape different from that of the trailing end of the fastening element. The borehole is cut or sized by the knife edges in a shaving or chiseling operation corresponding to the shape of the leading end. When the fastening element is completely driven in, the trailing region of the fastening elements having a different cross sectional shape is clamped in the sized borehole.

In the leading end region with the knife edges, preferably, the fastening element has a cross section different from a circular shape and changes into a circular cross section toward the trailing end of the fastening element. The knife edges at the leading end of the fastening element shaves or chisel the edge region of the previously drilled borehole. As a result, the borehole which initially has a circular cross section is converted into a non-circular cross section by the leading end of the fastening element. As the fastening element is driven into the borehole by axially directed hammer-like blows, the trailing end section of the fastening element having the circularly shaped cross section is tightly clamped in the borehole.

It is expedient if the cross section of the fastening element at its leading end is elliptical and is equipped with a knife edge or edges. The elliptical shape is very simple to form, for example, the leading end of the fastening element having a circular cross section is squeezed to a given extent. The leading end outfitted with a knife edge or edges can also have a non-circular cross section, for instance, a polygonal shape. It is only necessary to assure that the cross section of the fastening element is modified to such an extent towards its trailing end that it will be clamped in the non-circular shaped borehole when the fastening element is driven in. Accordingly, the trailing end section of the tubular fastening element is preferably provided with a circular cross section.

It has proven to be advantageous if the fastening element has a number of openings around its circumference and along its axial length, the diameter of such openings being less than the outside circle diameter of the cutting member of the drilling tool. The openings in the outer surface of tubular fastening elements serve to carry away the drillings or dust generated in the production of the borehole by the cutting member and transported over the shank of the drilling tool, the shank having a transporting helix.

In another preferred embodiment of the fastening apparatus according to the invention, the tubular fastening element has a slit extending along its entire axial length. In this embodiment, the axially extending slit in the fastening element can be elastically compressed in the radial direction against the elasticity or springing force of its material. The outside diameter of the fastening element which has not yet been joined, is greater than the nominal diameter of the borehole drilled in the receiving material or the outside circle diameter of the drill tip or cutting member. When the slit fastening element is driven in by axially directed hammer-like blows as the borehole is drilled, the fastening element is compressed radially to the nominal diameter of the borehole against the springing force of its material. When the fastening element has been driven in, the developed radial contact depression, together with the coefficient of adhesion and the contact surface between the borehole and the fastening element, determines the achievable holding value.

The drill tip can be permanently connected to the shank of the drilling tool. For example, the drilling tool can be a conventional masonry drill or rock drill which, you completion of the setting process, is pulled out of the borehole in which the fastening element is secured.

In an advantageous variation of the invention, the drill tip or cutting member is removably connected to the front end of the fastening element, in particular, it is attached to it. For the method of anchoring the fastening element, the drill tip can be connected with the drilling tool so that it is fixed to the tool for rotation with it, in particular, it can be attached to the leading shank end of the drilling tool. At the conclusion of the setting method, the shank can be removed from the drill tip by pulling it axially out of the fastening element. The drill tip remains in the borehole while the shank of the drilling tool is withdrawn from the borehole in which the fastening element is secured. In this variation, the fastening element is initially prepared with the drill tip attached. After the drill tip is attached to the leading end of the shank of the drilling tool, it can be detached from the leading end of the fastening element by applying a relatively small axial force and it remains connected to the shank so that it rotates with it. As a rule, this operation is effected automatically at that point in time when the front end of the fastening element which is over dimensioned relative to the outside circle of the drill tip is located at the opening into the borehole. The drill tip and the fastening element can be easily uncoupled with respect to rotation. The fastening element is initially driven into the borehole by axially directed hammer-like blows, so that it either removes the material from the edge regions of the borehole in accordance with the cross sectional shape at its leading end or it is radially compressed.

In accordance with the present invention, the method of forming anchorages is effected when a borehole is drilled with a drilling tool and a fastening element is anchored in the borehole during the drilling operation. The drilling tool is guided through an axially extending through opening or bore in the fastening element and the fastening element has a diameter exceeding the diameter of the borehole and is anchored during the drilling operation. During the drilling operation, the fastening element is driven into the borehole by hammer-like blows. The method of the present invention is a direct mounting method during which a borehole is formed by rotary drilling and the fastening element is anchored in the borehole at the same time. The method has the advantage of the direct mounting technique in that it is carried out quickly and easily and separate devices are not required for producing the borehole and for anchoring the fastening element. In addition, the receiving material in which the borehole is formed is treated with care in the method of the present invention. As a result, this novel direct mounting method can be used in less strong or brittle receiving materials, such as brick masonry.

In an another embodiment of the method of the present invention, while the fastening element is driven in by hammer-like blows, the substantially circular cross section of the borehole is sized by knife edges located at the leading end of the fastening element, that is the end first inserted into the borehole and the cross sectional shape of the leading end is different from a circular shape and, in particular, is elliptical, so that the knife edges shave or chisel off the surface of the borehole. The fastening element is anchored as it is driven into the borehole with the trailing end section of the fastening element having a circular cross section so that it is clamped in the borehole which has been sized to the non-circular cross section of the leading end of the fastening element. The fastening element can be a closed sleeve or, as an alternative, it can be provided with an axially extending slit. The axially extending slit enables an additional clamping in the borehole by means of radial compression of the axially extending slit sleeve against the springing force of the material of the fastening element as it is driven into the borehole.

In another variation of the method according to the invention, the anchoring of the over dimensioned fastening element in the borehole is achieved exclusively by elastic radial compression of the fastening element which is slit along its entire axial length, against the springing force of its material as it is driven into the borehole by axially directed hammer-like blows. In this variation of the method, a fastening element with an axially extending slit for its entire axial length is driven into the borehole. The anchorage of the fastening element in the borehole is effected by the clamping of the fastening element which is over-dimensioned relative to the nominal diameter of the borehole. The radial compression against the springing force of the material of the fastening element generates a radial force which, together with the coefficient of adhesion on the contact surface, determines the attainable holding value.

While the method can be carried out with a conventional masonry drill or rock drill which can be removed after the completion of the setting or anchoring procedure, in an advantageous variation, the fastening element is outfitted with a detachable drill tip at its leading end, that is the end first inserted into the borehole, and the leading shank end of the drilling tool is guided through the axial bore in the fastening element and is connected to the drill tip so that it is fixed to it for rotation, that is, the drill tip rotates with the drilling tool. As the method is carried out, the drill tip is disengaged from the leading end of the fastening element, so that as the drill tip rotates the fastening element does not, and the drill tip cuts the borehole. When the shank of the drilling tool is removed from the axially extending bore in the fastening element, the drill tip is detached from the leading end of the shank of the drilling tool, with a defined minimum force being applied, and remains in the borehole along with the fastening element. Since a defined minimum face is required to separate the drill tip from the leading end of the shank of the drilling tool, the withdrawal of the drilling tool can be used to check the minimum holding value of the anchorage.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there are illustrated and described preferred embodiments of the invention.

BRIEF DESCRIPTION OF THE DRAWING:

In the drawing:

FIG. 1 is an axially extending side view of a first embodiment of a fastening apparatus incorporating the present invention and including a fastening element and a drilling tool;

FIG. 2 is a transverse cross sectional view through a leading end section of the fastening element having knife edges, as shown in FIG. 1;

FIG. 3 is a side view similar to FIG. 1 of another embodiment of the fastening apparatus.

Figure 4:
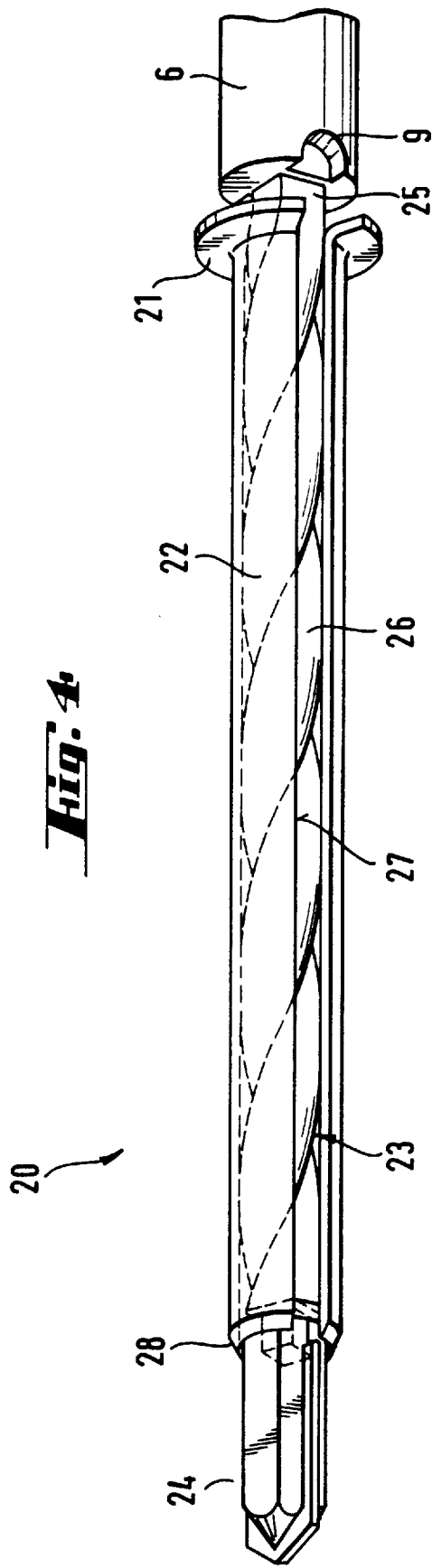
FIG. 4 is a side view similar to FIGS. 1 and 3 of still another embodiment of the fastening apparatus according to the invention.

DETAILED DESCRIPTION OF THE INVENTION:

In FIG. 1 a first embodiment of a fastening apparatus 1, incorporating the invention, is illustrated. The fastening apparatus 1 includes an axially extending tubular fastening element 2 and an axially extending drilling tool 3. As viewed in FIG. 1 the two parts have a leading end at the left hand end and a trailing end at the right hand end. The drilling tool has a drill tip or cutting member 4 at its leading end projecting axially outwardly from the leading end of the fastening element 2. In FIG. 1 the setting direction of the fastening apparatus is indicated by the arrow S. The trailing end of the drilling tool 3 has a chuck end secured in a chuck 6 of a hand held device, not shown in more detail, and outfitted with a rotary driving motor for the drilling tool 3 and with a percussion mechanism for generating axially directed hammer-like blows. In this embodiment, the drilling tool is a conventional masonry drill guided through an axially extending throughbore in the tubular fastening element 2.

At its leading end, the fastening element 2 has knife edges 8 for shaving or chiseling off the surface of the borehole formed by the drilling tool. In the axially extending region of the knife edges 8, the fastening element has a cross section different from a circular shape. In particular, the cross section adjacent the knife edges is elliptical as shown in FIG. 2. The elliptical cross section adjacent the knife edges changes over into a circular cross section extending to the trailing end of the fastening element 2. The drilling tool 3, guided through the axially extending bore in the fastening element, projects axially from the leading end of the fastening element and also from its trailing end. At the trailing end, the chuck end 5 projects out of the bore in the fastening element, so that it can be inserted into the chuck 6 of a hand held device. The trailing end of the fastening element 2 bears against the front end of the hand held device, so that axially directed hammer-like blows can be transmitted to the trailing end of the fastening element 2. At the leading end, the drill tip or cutting member 4 projects axially beyond the knife edges 8 so that the drill tip leads the knife edges at the leading end of the fastening element by several millimeters, for example, 10 mm, during the setting method.

The tubular fastening element 2 can have other cross-sectional shapes differing from the circular or elliptical shapes. The function of the fastening element 2, according to the invention, is insured when the leading end region of the fastening element 2 having the knife edges 8 has a circular cross-section, while the trailing end section of the fastening elements has a cross-section different from a circular shape. The knife edges 8 at the leading end of the fastening element 2 size the drilled borehole in accordance with their cross-sectional contour. When the fastening element 2 is fully driven into the borehole, the trailing end region having a different cross-sectional shape is anchored in the sized borehole by a clamping action.

As can be seen in FIG. 1, openings 7 extend through the tubular fastening element 2 and serves to carry off drillings formed as the borehole is drilled and transported by the helix on the drilling tool. Radially extending grooves 9 are also provided at the front end of the tool chuck 6 for removing the drillings.

The following is an explanation of the formation of a anchoring or fastening location by means of the fastening apparatus embodying the present invention. The drilling tool 3 which is a masonry drill or a rock drill in the illustrated embodiment, is guided through the axially extending bore of the fastening element 2. Since the diameter of the fastening element 2, especially in the section adjacent to the knife edges 8 is different from a circular shape, and is greater than the diameter of the outside circle of the drill tip or cutting member 4, it simplifies the guidance through of the drilling tool 3. The chuck end 5 of the drilling tool 3 is inserted into the chuck 6 of a rotary drilling device also incorporating a percussion mechanism for generating axially directed hammer-like blows.

To produce a fastening or anchoring location, the cutting member 4 is placed against the surface of a receiving material and the driving means in the hand held device is actuated. The cutting member 4 projects axially forwardly of the knife edges 8 on the fastening element 2 by several millimeters. The cutting member 4 produces a borehole with a substantially circular cross-section in the receiving material with the borehole having a diameter corresponding to the diameter of the outside circle of the cutting member 4. The fastening element 2 and the drilling tool 3 do not rotate together, because at the beginning of producing the borehole the fastening element 2 is axially displaceable relative to the shank of the drilling tool 3. The leading end of the fastening element 2 having a diameter greater than the diameter of the drilled borehole contacts the surface of the receiving material and is displaced rearwardly until its trailing end contacts the chuck 6 of the hand held device. Axially directed hammer-like blows developed by the hand held device are transmitted to the fastening element 2 and it is driven into the drilled borehole. As a result, the knife edges 8 at the leading end of the fastening element cut the surface of the borehole and size the surface in accordance with the cross-section shape of the fastening element 2 in the region of the knife edges 8. As the fastening element 2 is driven further into the borehole, the axially extending section of the fastening element having a circular cross-section is clamped into the borehole which has been sized with a non circular shape. At the end of the anchoring procedure, the drilling tool is removed from the borehole containing the fastening element and the procedure can be repeated at another location with a new fastening element.

FIG. 3 is a side view of a modified fastening apparatus 10. Similar to the fastening apparatus as shown in FIG. 1, fastening apparatus 10 has a drilling tool 3 with a drill tip or cutting member 4 and a chuck end 5 both projecting axially outwardly from the opposite ends of a fastening element 12. Chuck end 5 is shown inserted into a chuck 6 of a hand held device. At the front end of the hand held device radially extending grooves 9 are formed in the chuck 6 for carrying off drillings. Fastening element 12 has knife edges 18 at its leading end for shaving off the surface of the borehole formed by the drilling tool 3. At its trailing end fastening element 12 has a circumferentially extending annular collar 11 serving as a stop at the surface of the receiving material, not shown, and signals the end of the fastening or anchoring procedure as soon as the collar contacts the surface of the receiving material or of a structural component to be secured to the receiving material. In addition, the annular collar 11 forms a contact surface for the chuck 6 for transmitting axially directed hammer-like blows to the fastening element 12. The fastening element 12 has an axially extending slit 17 extending for its full axial length. The axially extending slit 17 tapers inwardly in the region of the knife edges 18 and can be closed by a weld. In the region adjacent to the knife edges 18, the fastening element 12 is over dimensioned relative to the borehole formed by the drilling tool 3 due to the axially extending slit 17, such over dimensioning can be increased towards the trailing end of the fastening element. Accordingly, the axially extending section of the fastening element 12 having a circular cross section is clamped in the borehole which is sized to have a non circular shape when the fastening element 12 is driven in by hammer-like blows and, in addition, the fastening element is also compressed radially against the spring force of its material. Such radial compression generates an additional radial force which reinforces the holding value of the fastening element in the borehole.

In FIG. 4 still another embodiment of a fastening apparatus 20, embodying the present invention, is displayed. The fastening apparatus 20 includes an axially extending drilling tool 23 guided in the axially extending bore of a fastening element 22. The leading end and the drilling end of the drilling tool project axially from the leading end and from the trailing end, respectively, of the fastening element 22. At its leading end, the drilling tool has a drill tip or cutting member 24 and at its trailing end it has a chuck end 25. The chuck end 25 of the drilling tool 23 is inserted into the chuck 6 of a hand held device, not shown, and the chuck is provided with radially extending grooves 9 for carrying off the drillings formed as the borehole is drilled by the drilling tool. The fastening element has a chamfer 28 at its leading end. At its trailing end, the fastening element has a circumferentially extending annular collar 21 which serves as a depth stop and, at the same time, forms a contact surface for the chuck 6. An axially extending slit 27 is formed along the entire axial length of the fastening 22. The drill tip or cutting member 24 is formed as generally cylindrical element having an insertion recess for the leading end of the shank 26 of the drilling tool 23. As illustrated by way of example, the leading end of the shank 26 of the drilling tool 23 is a four cornered spindle twisted along its axial length to form a helix. The recess in the cutting member 24 can be shaped with as many corners as desired so that the cutting member is connected with the shank 26 and rotates with the shank.

The fastening element 22 can be prepared for the fastening method with the drill tip or cutting member 24 secured to its leading end provided with the chamfer 28. Such attachment is further facilitated by the axially extending slit 27. In carrying out the fastening method, it is only necessary to insert the shank 26 of drilling tool 23 through the axially extending bore in the fastening element 22 and into the recess in the cutting member 24. The outer diameter of the fastening element 28 is greater than the diameter of the outside circle of the cutting member 24. Accordingly, the fastening element 22 is over dimensioned relative to the borehole drilled by the cutting member and projecting axially from the fastening element during the fastening method. The driving in of the fastening element 22 is effected at its trailing end in contact with the chuck 6. The chamfer 26 at the leading end of the fastening element 22 facilitates insertion of the fastening element in the borehole of a smaller diameter formed by the drilling tool 23. When the fastening element 22 is driven into the borehole by hammer-like blows, the fastening element is compressed radially against the springing force of its material. The resulting radial force in combination with the coefficient of adhesion and the contact surface defines the attainable holding value. After the completion of the anchoring of the fastening element 22, the shank 26 of the drilling tool 23 is withdrawn from the borehole out of the bore in the fastening element. The cutting member 24, however, remains in the borehole at the leading end of the fastening element. The clamping force between the shank 26 and the recess in the drill tip or cutting member 24 is advisably adjusted so that a certain minimum force must be exerted to withdraw the shank 26. In this way, the withdrawal of the shank 26 can be used at the same time to check the minimum holding value of the anchored fastening element.

As is readily apparent, the drilling tools illustrated and described can have a drill tip or cutting member permanently secured with the shank or one which can be detached from the shank in the various embodiments illustrated. The tubular fastening elements have load application means at their trailing ends. Such load application means can be internal or external threads, grooves for snap in connections, shoulders or the like. The tubular fastening elements can also be component parts of special fastening means, such as for fastening insulation panels and the like. For this purpose, the tubular fastening element can be embedded in a cylindrical shaft which extends inwardly of a contact pressure plate. The tubular fastening element can also be a component part of holders for cables or pipes.

What is claimed as new and desired to be protected by Letters Patent is set forth in the appended claims:

1. Fastening apparatus comprising an axially extending drilling tool (3, 23) for drilling a borehole, said drilling tool having a cutting member (4, 24) at a leading end and having a trailing end shaped to be inserted into a chuck (6) of a hand held drilling device capable of providing a rotary drive and axially directed percussive blows, said cutting member when rotated forming a cutting circle diameter, an axially extending tubular fastening element (2, 12, 22) having a leading end a trailing end and an axially extending bore located between the leading and trailing ends thereof, said fastening element arranged to be anchored in the borehole formed by said drilling tool (3, 23), said fastening element (2, 12, 22), having a larger outside diameter than the cutting circle diameter of said cutting member, said drilling tool secured in the chuck (6) extends through said bore with said leading end thereof projecting axially outwardly from the leading end of said fastening element and with the trailing end thereof projecting axially outwardly from the trailing end of said fastening element, said drilling tool arranged to be rotated by the drilling device with said fastening element being separated from rotation, and the trailing end of said fastening element (2, 12, 22) arranged to be contacted by the hand held drilling device so that axially directed hammer-like blows are transmitted to the fastening element, whereby the fastening element (2, 12, 22) is simultaneously driven axially into the borehole being formed by said drilling tool for anchoring the fastening element therein.

2. Fastening apparatus, as set forth in claim 1, wherein said fastening element (2, 12) having knife edges (8, 18) at the leading end thereof and having a cross-sectional shape in a region adjacent said knife edges different from a cross-sectional shape of an axially extending trailing end section of said fastening element (2, 12).

3. Fastening apparatus, as set forth in claim 2, wherein the leading end of the said fastening element (2, 12) has a cross-sectional shape different from a circular shape and changes over into a circular shape towards the trailing end section of said fastening element (2, 12).

4. Fastening apparatus, as set forth in claim 3, wherein the leading end of said fastening element has an elliptical cross-sectional shape.

5. Fastening apparatus, as set forth in claim 2 or 3, wherein said fastening element (2) has a plurality of openings, extending radially therethrough and distributed around the circumference thereof along the axial length thereof, and the diameter of said openings (7) being less than the outside circle diameter of the cutting member (4).

6. Fastening apparatus, as set forth in claim 1 or 2, wherein said tubular fastening element (2, 12) has a slit (17, 27) extending along the axial length thereof and said fastening element being elastically compressive in the radial direction thereof against a springing force of the fastening element material.

7. Fastening apparatus, as set forth in claim 1 or 2, wherein said cutting member (24) is detachably connected with the leading end of said fastening element (22) and is engageable with said drilling tool (23) so that it can rotate with the drilling tool.

8. Fastening apparatus, set forth in claim 7, wherein said drilling tool has an axially extending shank (26) with a leading end, and said cutting member (24) is connectable to the leading end of said shank (26) and is axially detachable from the leading end of said shank (26).

9. Method of anchoring a fastening element in a borehole formed in a receiving material by drilling an axially extending borehole in the receiving material and anchoring the fastening element in the borehole comprising the steps of inserting an axially extending drilling tool (3, 23) having an outside diameter through an axially extending bore in a fastening element (2, 12, 22) having an outside diameter where the bore has a diameter greater than the outside diameter of the drilling tool, rotating the drilling tool by means of a drilling device and forming a borehole with a smaller diameter than the outside diameter of the fastening element and maintaining said fastening element separate from the rotation of the drilling tool, while rotating the drilling tool directing axially directed hammer-like blows against the fastening element and driving the fastening element into anchored engagement with the borehole formed by the drilling tool.

10. Method, as set forth in claim 9, comprising the steps of while driving the fastening element (2, 12) into the borehole, sizing the borehole having a substantially circular cross-section by knife-edges (8, 18) located on a leading end of the fastening element (2, 12) with the leading end having the knife edges having a cross-sectional shape different from a circular shape, and anchoring the fastening element (2, 12) by providing a trailing end section of the fastening element with a circular cross-section and clamping the circular cross-section in the borehole sized to the cross-sectional shape of the leading end section of the fastening element (2, 12).

11. Method, as set forth in claims 9 or 10, comprising the steps of providing the fastening element as over dimensioned relative to the borehole drilled in the receiving material and having an axial slit extending over its full axial length so that a springing force of the fastening element material anchors the fastening element in the borehole as it is being driven by hammer-like blows into the borehole and compressed radially.

12. Method, as set forth in claim 9 or 10, comprising the steps of securing a detachable cutting member 24 at a leading end of the fastening element 22, coupling a leading end of the drilling tool extending through a bore in the fastening element (22) to the cutting member (24) so that the cutting member is rotatable with the drilling tool, disengaging the cutting member (24) from the leading end of the fastening element (22) with the fastening element being separated from rotation with the drilling tool, and upon completing drilling of the borehole, detaching the drilling tool from the cutting member, (24) and removing the drilling tool from the bore in the fastening element and providing a defined minimum force for removing the drilling tool from the bore in the fastening element while the fastening element remains in the borehole drilled by the drilling tool.

* * * * *